M. HONIGMANN.
UTILIZATION OF EXHAUST STEAM.
No. 10,675. Reissued Dec. 22, 1885.
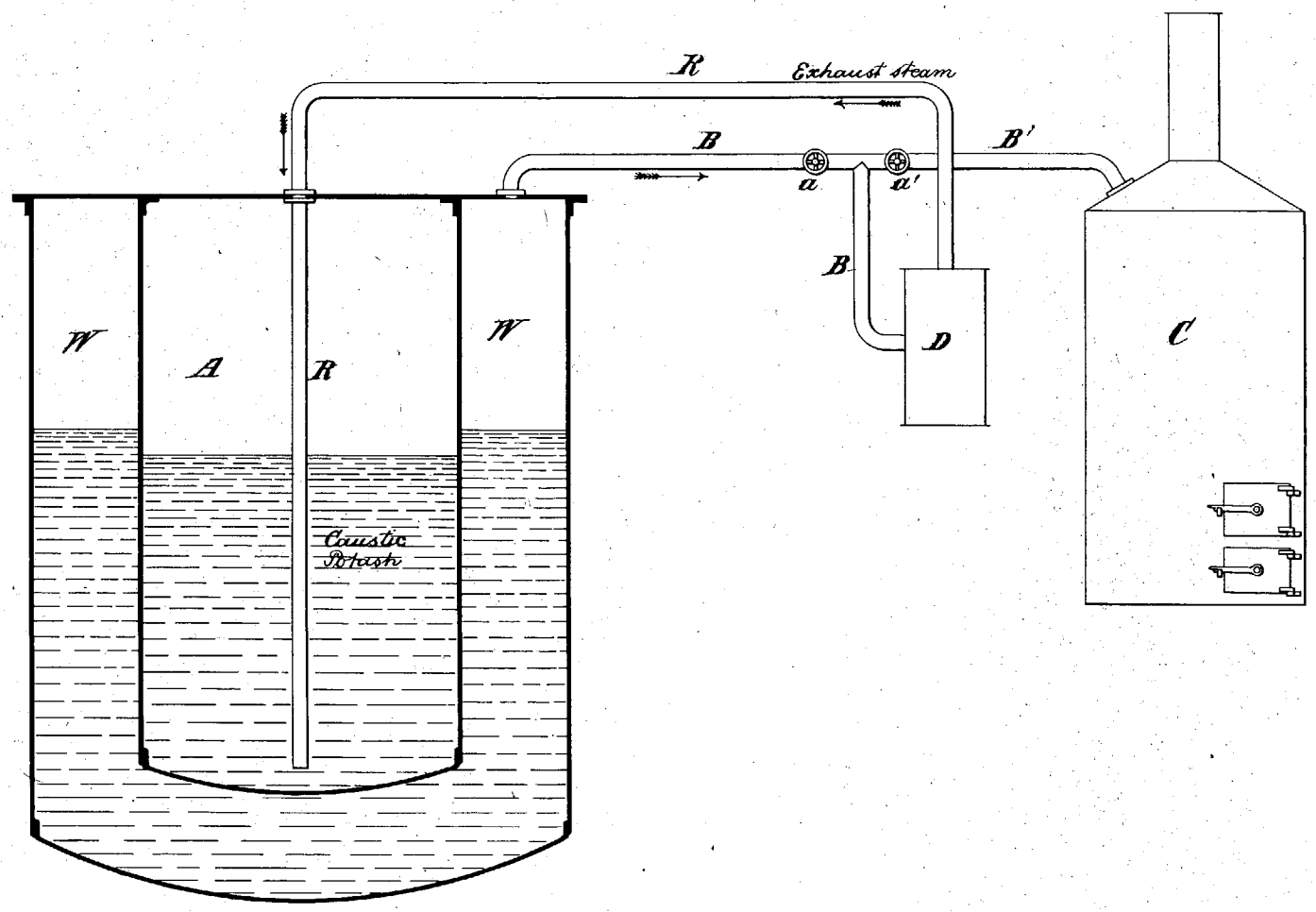
Witnesses:
C. Sundgren
Jno. Haynes
Inventor:
Moritz Honigmann
by his Atty
Brown & Hall

UNITED STATES PATENT OFFICE.

MORITZ HONIGMANN, OF AIX-LA-CHAPELLE, GERMANY.

UTILIZATION OF EXHAUST-STEAM.

SPECIFICATION forming part of Reissued Letters Patent No. 10,675, dated December 22, 1885.

Original No. 287,937, dated November 6, 1883. Application for reissue filed October 6, 1884. Serial No. 144,891.

*To all whom it may concern:*

Be it known that I, MORITZ HONIGMANN, a subject of the Emperor of Germany, residing at Aix-la-Chapelle, Germany, have invented a new and useful Improvement in the Utilization of Exhaust-Steam, of which the following is a specification, reference being had to the accompanying drawing.

The invention consists in a method of utilizing exhaust-steam, whereby steam may be produced under pressure, and locomotive and other steam engines may be worked without the use of fire.

The said invention is based on the property of chemical compounds whose solutions have a higher boiling-point than water—caustic soda or potash, for instance—to absorb water-vapors, and thereby to produce temperatures which are much higher than those of steam under pressure.

The accompanying drawing represents the application of my invention to a steam-engine.

D is an arbitrary representation of the cylinder of a steam-engine.

W and A represent the reservoirs, arranged one within the other. The exhaust-steam passes through the tube R, down to the bottom of the inner reservoir, A. This reservoir A is filled about three parts full of dry or highly-concentrated caustic potash. This latter absorbs the water-vapors introduced with an increasing temperature. This increased temperature of the inner reservoir is communicated to hot water contained in the outer reservoir, W, and by this means steam is produced in W, which passes by a pipe, B, to the engine-cylinder D, and serves to work the latter. The exhaust-steam is reintroduced into the reservoir A in the manner as before described.

The reservoir W must be refilled from time to time with hot water from a boiler, and the reservoir A be emptied from time to time of the diluted caustic soda, and refilled with either dry or highly-concentrated caustic soda. The reconcentration of the caustic soda or potash is effected in evaporating-pans or suitable boilers.

It will be understood that it is not necessary to confine the working of my invention to any one special set of apparatus.

Of course, in starting the engine it is necessary to use steam from an outside source. I have shown a small boiler, C, which may be connected by a pipe, B′, with the pipe B, leading to the cylinder D. In the pipes B B′ are cocks or valves *a a′*, the former of which is closed when steam is supplied from the boiler C, and the latter of which is closed when steam is supplied from the reservoir W.

The natural law utilized in carrying out my invention has long been known to scientists, and a common illustration of this law has been afforded by sprinkling the bulb of a thermometer with salt, and holding it in the vapor of boiling water, when it is found that the thermometer will indicate a temperature of more than 100° Reaumur, showing that a higher temperature was produced than that of the steam or vapor at atmospheric pressure.

When my engine is to be put in operation, steam under a certain pressure is introduced into the water contained in the reservoir W, and the temperature of the whole boiler is raised until the atmospheric pressure is reached under which the engine is desired to work. If the engine is to work under a pressure of three atmospheres, the temperature must be raised to about 145° Reaumur. The exhaust-steam is introduced through the pipe R into the caustic soda or potash in the reservoir A, wherein it is completely condensed. The absorbed steam heats the caustic soda or potash above the temperature of the water in the reservoir W. When the temperature of the caustic soda or potash is only a few degrees higher than the water, the former will give off enough heat to generate steam from the water for keeping the engine working and the temperature of the boiler constant. The more steam used in driving the engine the more will be introduced into the caustic soda or potash, and in consequence the more heat will be stored in the same. The generation of steam is therefore self-regulating. This is not a perpetual or self sustaining power, for through the absorption of steam the caustic soda or potash becomes more and more diluted, and therefore the boiling-point is gradually lowered. The engine can therefore only perform work up to the time when the boiling-point has sunk so low that the difference between the temperature of the caustic soda or potash and the temperature of the water is not great enough to produce the heat for developing the necessary steam. For the production of five-horse power for five hours it will be necessary to charge the reservoir A with about five hundred (500) kilograms of caustic-soda solution. After this has become so diluted that it can no longer be used, it must be again concentrated, and the reservoir A charged with a fresh supply.

Having thus described the nature of my invention and the manner in which the same is to be carried out in practice, I disclaim the general method of evaporating water by means of the absorption of exhaust-steam by caustic soda or potash; but wish to be understood that I claim—

The fireless running of locomotives or other steam-engines by first generating an initial pressure in the steam-generator of the locomotive or engine by means of any source of heat which is external of and independent from the said locomotive or engine, while the subsequent pressure in said generator is produced exclusively by means of the absorption of the exhaust-steam of said locomotive by a caustic-soda or potash lye which is in direct contact with the said generator.

MORITZ HONIGMANN.

Witnesses:
GEO. F. LINCOLN,
PETER HEEKMANUS.